(12) United States Patent
Nakamura et al.

(10) Patent No.: US 8,994,866 B2
(45) Date of Patent: Mar. 31, 2015

(54) ANALOG-TO-DIGITAL CONVERTER, PHOTOELECTRIC CONVERSION DEVICE, AND IMAGING SYSTEM

(75) Inventors: Kohichi Nakamura, Kawasaki (JP); Hiroki Hiyama, Sagamihara (JP); Tetsuya Itano, Sagamihara (JP); Kazuhiro Saito, Tokyo (JP); Yu Maehashi, Kawasaki (JP); Koichiro Iwata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 13/612,402

(22) Filed: Sep. 12, 2012

(65) Prior Publication Data

US 2013/0088627 A1  Apr. 11, 2013

(30) Foreign Application Priority Data

Oct. 7, 2011  (JP) ................................ 2011-223296

(51) Int. Cl.
  *H04N 5/335*  (2011.01)
  *H03M 1/56*  (2006.01)
  *H04N 5/378*  (2011.01)

(52) U.S. Cl.
  CPC ..................... *H04N 5/378* (2013.01)
  USPC ......................... 348/308; 341/169

(58) Field of Classification Search
  USPC .................. 348/308; 341/155, 166, 169, 172
  See application file for complete search history.

(56) References Cited

U.S. PATENT DOCUMENTS

| 8,169,498 | B2 * | 5/2012 | Yamashita | ................. 348/222.1 |
| 8,411,186 | B2 * | 4/2013 | Iwasa | ............................ 348/308 |
| 2004/0217895 | A1 | 11/2004 | Koyanagi | |
| 2007/0052831 | A1 * | 3/2007 | Ogura et al. | .................. 348/308 |
| 2008/0224913 | A1 * | 9/2008 | Suzuki et al. | ................. 341/155 |
| 2008/0278363 | A1 | 11/2008 | Okumura | |
| 2009/0084941 | A1 * | 4/2009 | Muramatsu et al. | ....... 250/208.1 |
| 2010/0079611 | A1 * | 4/2010 | Suzuki et al. | ............. 348/222.1 |

FOREIGN PATENT DOCUMENTS

| JP | 2003-198372 A | 7/2003 |
| JP | 2008-259228 A | 10/2008 |
| JP | 2008-283556 A | 11/2008 |

* cited by examiner

*Primary Examiner* — Timothy J Henn
(74) *Attorney, Agent, or Firm* — Canon USA Inc IP Division (57) ABSTRACT

A photoelectric conversion device includes a counter circuit configured to count a first clock signal to output a count signal thereof, a second clock signal generation unit configured to generate a second clock signal based on the first clock signal, and a clock synchronization unit configured to output a count start signal in synchronization with the second clock signal, wherein the counter circuit performs a counting operation in response to the count start signal synchronized with the second clock signal.

14 Claims, 13 Drawing Sheets

ANALOG-TO-DIGITAL CONVERTER, PHOTOELECTRIC CONVERSION DEVICE, AND IMAGING SYSTEM

BACKGROUND OF THE INVENTION

1. Field of the Invention

The present disclosure relates to an analog-to-digital (A/D) converter, a photoelectric conversion device, and an imaging system.

2. Description of the Related Art

Japanese Patent Application Laid-Open No. 2008-259228 discusses a photoelectric conversion device used in digital cameras, digital camcorders, and the like. The photoelectric conversion device includes a column analog-to-digital converter (ADC), as one of exemplary systems thereof, in which each column of a pixel array includes an ADC. Among the systems used in the column ADC, a ramp type ADC is widely used. In the ramp type ADC, an analog signal and a reference signal which varies with time are compared in magnitude to each other in order to measure a time period after the reference signal starts varying before the magnitude relation therebetween is reversed.

In the ramp type ADC, the time period after the reference signal starts varying before the magnitude relation between the reference signal and the analog signal is reversed is measured by using a counter circuit. The counter circuit is controlled as to whether the counter circuit counts the clock signal by a count actuating signal. In other words, where the counter circuit receives a clock signal and a count actuating signal, however, if timing for inputting both signals is not managed, a count start time and a count completion time may be shifted from target timing upon performing the analog-to-digital (A/D) conversion. More specifically, in the photoelectric conversion device, even signals generated based on the same amount of incident light may be converted into different digital values. As a result, an image obtained therefrom may be degraded.

SUMMARY OF THE INVENTION

According to an aspect of the present disclosure, an analog-to-digital (A/D) converter includes a plurality of comparators each configured to compare a reference signal and an analog signal, a reference signal supply unit configured to supply the reference signal, which varies with time, to the plurality of comparators, and a counter circuit configured to count a first clock signal to output a count signal thereof. The A/D converter further includes a second clock signal generation unit configured to generate a second clock signal based on the first clock signal, and a clock synchronization unit configured to output a count start signal in synchronization with the second clock signal, wherein the counter circuit performs a counting operation in response to the count start signal synchronized with the second clock signal.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles as disclosed herein.

DESCRIPTION OF THE EMBODIMENTS

Various exemplary embodiments, features, and aspects of the disclosure will be described in detail below with reference to the drawings.

In the present exemplary embodiment, a photoelectric conversion device in which an ADC is used as a column ADC is exemplified.

Figure 1:
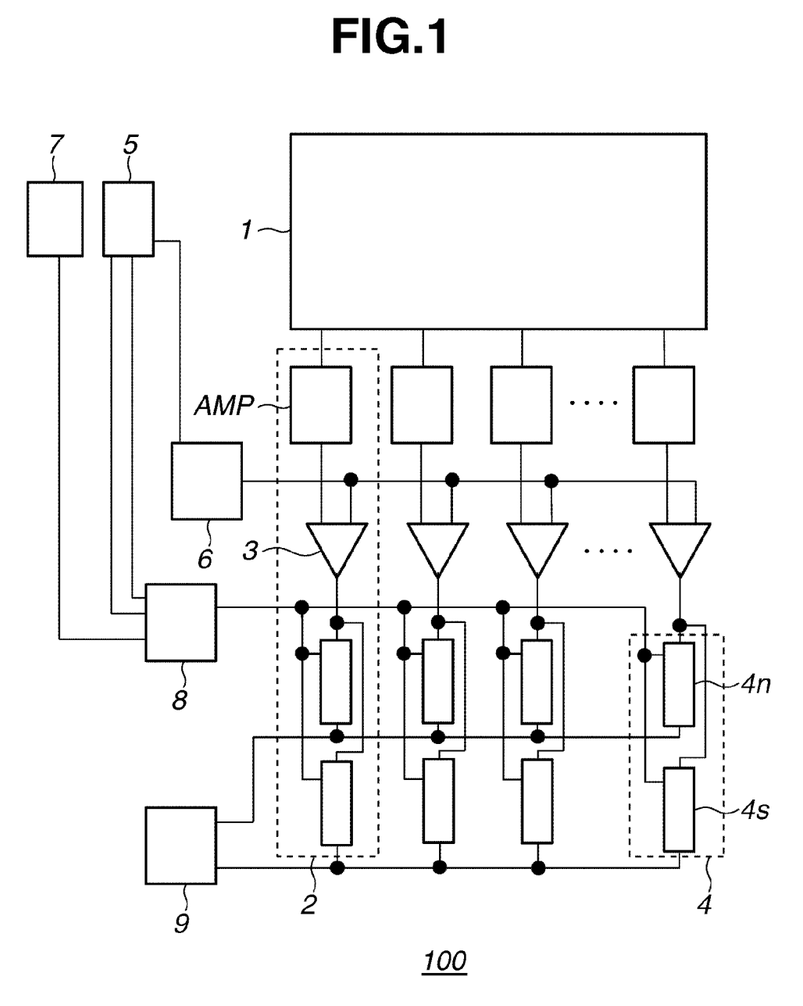
FIG. 1 illustrates an example of a configuration of a photoelectric conversion device according to a first exemplary embodiment.

FIG. 1 illustrates an example of a configuration of a photoelectric conversion device according to the present exemplary embodiment. A photoelectric conversion device 100 includes a pixel array 1, column read-out units 2, a timing signal generation unit 5, a reference signal supply unit 6, a first clock signal generation unit 7, a count signal generation unit 8, and a signal processing unit 9.

The pixel array 1 includes a plurality of columns of pixels. Each of the column read-out units 2 is provided to each column of the pixels in a corresponding manner. Each of the column read-out units 2 has a function of an ADC for converting an analog signal from the corresponding column of the pixels into a digital signal and includes a comparator 3 and a storage unit 4. In the present exemplary embodiment, each storage unit 4 includes a first storage unit 4n and a second storage unit 4s. Each column read-out unit 2 further includes an amplifier AMP for amplifying a signal output from the pixel array 1. The amplifier AMP may be either one of an inverting amplifier or a variable gain amplifier.

The timing generation unit 5 generates various signals for controlling an operation of the photoelectric conversion device 100. The timing generation unit 5 according to the present exemplary embodiment supplies a ramp control signal RMP_EN to the reference signal supply unit 6. The timing generation unit 5 further supplies a count start signal CNT_EN and a reset signal RST to the count signal generation unit 8.

The reference signal supply unit 6 supplies a ramp signal as a reference signal to a plurality of comparators 3. A signal level of the ramp signal monotonically varies with the passage of time. The "monotonically varying" means that, for example, the signal level decreases, but not increases, with the passage of time in a case of a monotonic decrease and further means that the signal level decreases step by step. In the reference signal supply unit 6, a start and an end of the varying of the reference signal are controlled in response to the ramp control signal RMP_EN supplied from the timing generation unit 5.

The first clock signal generation unit 7 applies a first clock signal CLK1 to the count signal generation unit 8.

The count signal generation unit 8 supplies a count signal CNT_OUT to the storage unit 4 in response to the count start signal CNT_EN, a reset signal RST, and the ramp control signal RMP_EN.

The signal processing unit 9 is a circuit for processing a digital signal output from the storage unit 4. Exemplified as the processing performed by the signal processing unit 9 is differential processing provided to two signals output from the first storage unit 4n and the second storage unit 4s.

In FIG. 1, a vertical scanning unit for selecting a row of the pixel array and a horizontal scanning unit for selecting the storage unit 4 are omitted.

The count signal generation unit 8 is described below with reference to FIG. 2. The count signal generation unit 8 includes a second clock signal generation unit 31, a clock synchronization unit 32, and a counter circuit 33.

The second clock signal generation unit 31 receives the first clock signal CLK1 and the reset signal RST. The second clock signal generation unit 31 outputs a second clock signal CLK2 based on the first clock signal CLK1. The second clock signal CLK2 causes the first clock signal CLK1 to delay a phase thereof and to vary frequency thereof. The second clock signal generation unit 31 outputs the second clock signal CLK2 fixed at level H or level L in a period in which the reset signal RST is at level H. The clock synchronization unit 32 outputs an internal count start signal CNT_ENI obtained such that the count start signal CNT_EN is brought into synchronization with the second clock signal CLK2 in response to the count start signal CNT_EN and the second clock signal CLK2. The counter circuit 33 performs a counting operation for counting the first clock signal CLK1 in a period in which the internal count start signal CNT_ENI at level H is input in response to the first clock signal CLK1 and the internal count start signal CNT_ENI.

Figure 3:
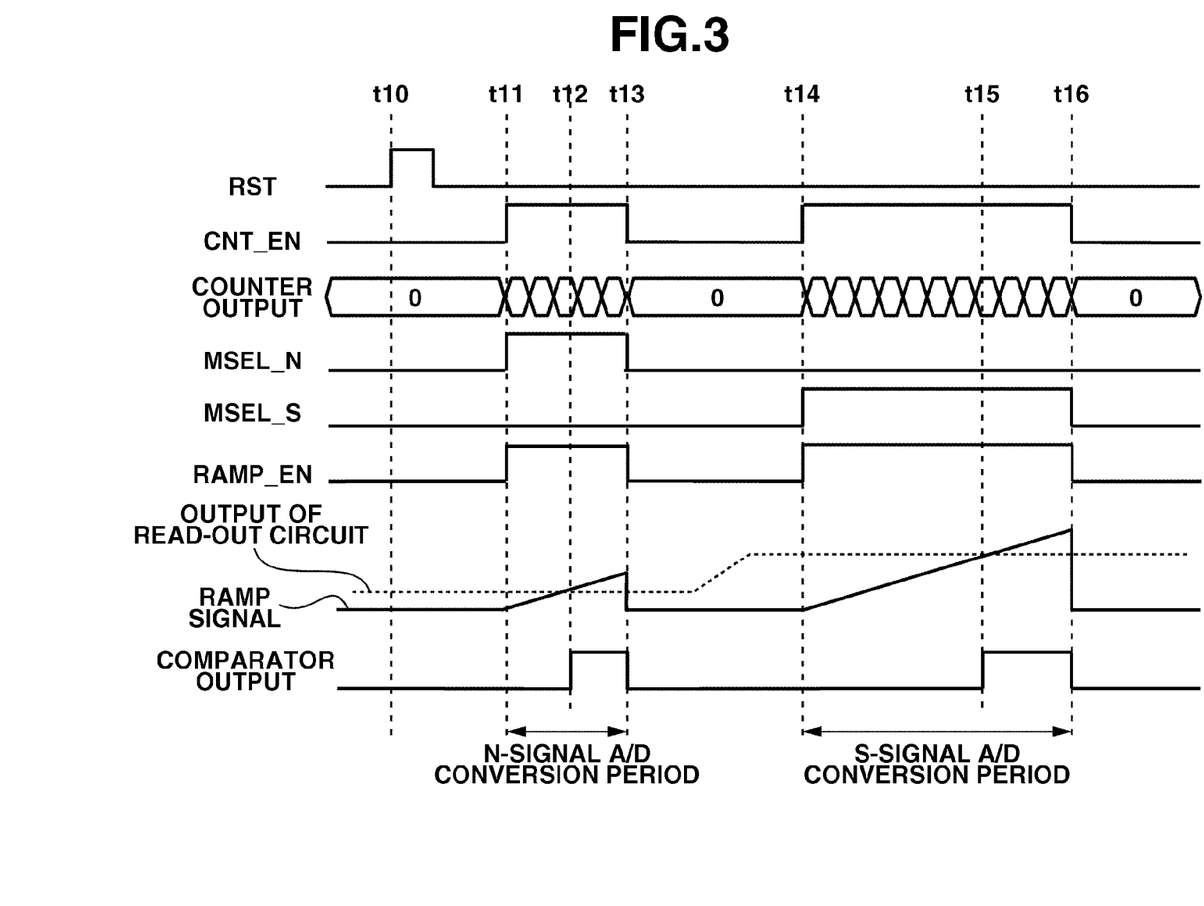
FIG. 3 illustrates an example of an operation of the photoelectric conversion device according to the first exemplary embodiment.

An A/D conversion operation performed by the photoelectric conversion device 100 is summarized below with reference to FIG. 3. FIG. 3 selectively illustrates an operation of the A/D conversion provided to a signal from the pixels of a certain row.

In FIG. 3, a signal MSEL_N determines whether an output of the comparator 3 causes the count signal to be stored in the first storage unit 4n. If the output of the comparator 3 reaches the level H in a period in which the signal MSEL_N is also at the level H, a count signal at a point of time at which the output of the comparator 3 is shifted to level H is stored in the first storage unit 4n. Similarly, a signal MSEL_S determines whether the output of the comparator 3 causes the count signal to be stored in the second storage unit 4s. In a case where the output of the comparator 3 reaches level H in a period in which the signal MSEL_S is at level H, a count signal at a point of time at which the output of the comparator 3 is shifted to level H is stored in the second storage unit 4s. A potential Vin is a potential of an input terminal on a side whereat an analog signal of the comparator 3 is input.

In a case where the reset signal RST temporally reaches level H from time t10, the second clock signal generation unit 31 is reset.

Thereafter, the signal CNT_EN reaches level H at time t11 whereat the A/D conversion period for converting an N signal is started. During the N signal A/D conversion period, the signal MSEL_N is at level H and the signal MSEL_S is at level L, respectively. The N signal is generated due to a reset of a pixel. The N signal is composed of a noise and an offset. For example, in a case of the pixel including a pixel amplifier for outputting a signal corresponding to a charge amount generated in a photoelectric conversion unit, the N signal may include components generated due to the reset of an input unit of the pixel amplifier. In a case of a configuration including the amplifier AMP, the N signal may include an offset generated by the amplifier AMP. During the N signal A/D conversion period, the ramp control signal RAMP_EN reaches level H and thus the potential of the reference signal varies with the passage of time.

In a case where the magnitude relation between the potential Vin and the ramp signal is reversed at time t12 during the N signal A/D conversion period, an output of the counter circuit 33 is stored in the first storage unit 4n in response to the reversal.

When the N signal A/D conversion period ends at time t13, an S signal A/D conversion period starts from time t14. In the S signal A/D conversion period, the signal MSEL_S is at level H and the signal MSEL_N is at level L. The S signal is obtained based on an electrical charge generated in the photoelectric conversion unit. Signal amplitude of a pixel including the above exemplified pixel amplifier becomes larger by an amount corresponding to the charge amount generated in the photoelectric conversion unit with respect to the N signal. More specifically, the S signal includes the N signal here. Therefore, by taking a difference between the S signal and the N signal, the noise and the offset can be decreased. In the configuration illustrated in FIG. 1, the noise and the offset can be decreased by subjecting the signals held in the first storage unit 4n and the second storage unit 4s to the differential processing in the signal processing unit 9.

In a case where the magnitude relation between the potential Vin and the ramp signal is reversed at time t15 during the S signal A/D conversion period, the output of the counter circuit 33 is stored in the second storage unit 4s in response to the reversal. According to the above, the N signal and the S signal are subjected to the A/D conversion to be stored in the storage unit 4. Thereafter, a horizontal scanning unit (not illustrated) transmits the signal held in the storage unit 4 to the signal processing unit 9. Then, an operation for 1 row is ended. A repetition of the above operation completes the conversion of 1 frame.

Figure 4:
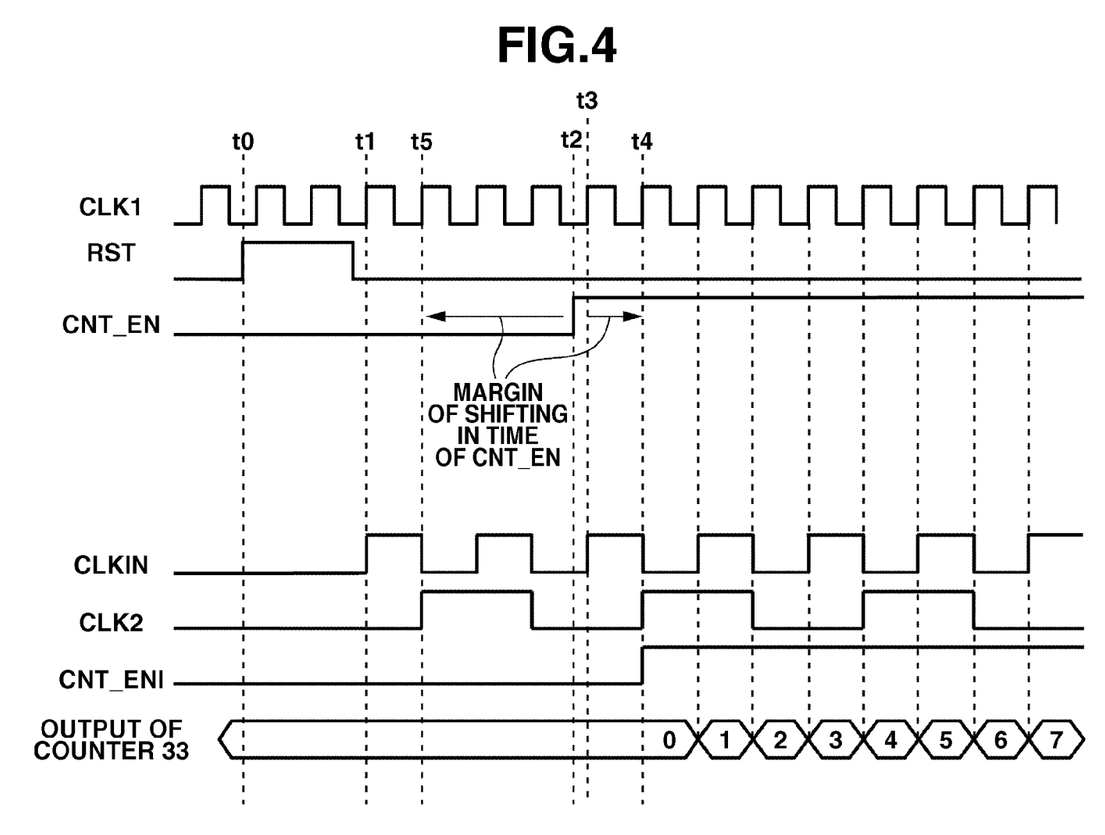
FIG. 4 illustrates an example of an operation of the count signal generation unit according to the first exemplary embodiment.

An operation of the count signal generation unit 8 is described below with reference to FIG. 4. A case where the second clock signal generation unit 32 divides a frequency of the first clock signal into halves, i.e., into 2 stages, thereby generating a second clock signal CLK2, is exemplified. A clock signal obtained such that the frequency of the first clock signal is divided into halves is referred to as a clock signal CLKIN. In an initial state, the output of the counter circuit 33 is 0. The counter performs a counting operation by n-bit digital signals. The counter may be either one of the binary counter and a gray counter. Furthermore, the counter may be any other counter. In FIG. 4, a count value is indicated by using a decimal digit for the sake of an easy understanding.

At time t0, the reset signal RST is shifted to level H. Since the second clock signal generation unit 31 does not output the second clock signal CLK2 during a period in which the reset signal RST is at level H, both of the clock signal CLKIN and the second clock signal CLK2 are at level L. The reset signal RST is not necessarily synchronized with the first clock signal CLK1. At the time t0, since a level of the count start signal CNT_EN is low, the internal count start signal CNT_ENI is also at level L. Therefore, the counter circuit 33 keeps the output of its own to 0 without performing the counting operation.

After the reset signal RST is shifted to level L, the second clock signal generation unit 31 starts an operation in synchronization with a rise of the first clock signal CLK1 at time t1. A level of the intermediate clock signal CLKIN is shifted in synchronization with the rise of the first clock signal CLK1. A level of the second clock signal CLK2 is shifted in synchronization with a fall of the intermediate clock signal CLKIN.

At time t2, the count start signal CNT_EN is shifted to level H. The clock synchronization unit 32 causes the count start signal CNT_EN to be output as the internal count start signal CNT_ENI synchronized with the second clock signal CLK2. Therefore, the counter circuit 33 starts its counting operation from time t4 later than time t3.

The counter circuit 33 performs its counting operation in synchronization with the first clock signal CLK1, so that the counter circuit 33 continues, also on and after time t4, its operation at the same frequency as that of the first clock signal CLK1 during a period in which the internal count start signal CNT_ENI is at level H.

The operation of the counter circuit 33 is summarized above. To describe an effect of the present exemplary embodiment, a case where a start of the counting operation of the counter circuit 33 is controlled by the count start signal CNT_EN is considered below. In this case, the counting operation of the counter circuit 33 is controlled by the count start signal CNT_EN that is asynchronous with any of the clock signals.

In FIG. 4, the second clock signal generation unit 31 is reset every time a row of the pixel array is selected. In other words, the second counter circuit is reset once in a horizontal synchronization period. However, the second counter circuit is not reset in each horizontal synchronization period but the second counter circuit may be reset at least once in a frame, i.e., in a vertical synchronization period. A horizontal synchronization signal for defining the horizontal synchronization period and a vertical synchronization signal for defining the vertical synchronization period are generated in the timing signal generation unit 5 or provided from an external device.

Possible problems raised in this configuration are described below with reference to FIGS. 5A and 5B. The count start signal CNT_EN and the "comparator output" are common to both of FIGS. 5A and 5B. An example of FIG. 5A differs from an example of FIG. 5B in that a phase difference of the first clock signal CLK1 with respect to the rise of the count start signal CNT_EN differs to each other. In a case of FIG. 5A, the first clock signal CLK1 is at level H at time tA at which the count start signal CNT_EN rises. A count signal CNT_OUT output by the counter circuit 33 is shifted from 0 to 1 at time tC. In a case of FIG. 5B, the first clock signal CLK1 is at level L at time tA at which the count start signal CNT_EN rises. Since a phase of the count signal CNT_OUT output by the counter circuit 33 delays with respect to the first clock signal CLK1 of FIG. 5A, the count signal CNT_OUT is shifted from 0 to 1 at time tB earlier than time tC.

Figure 5A:
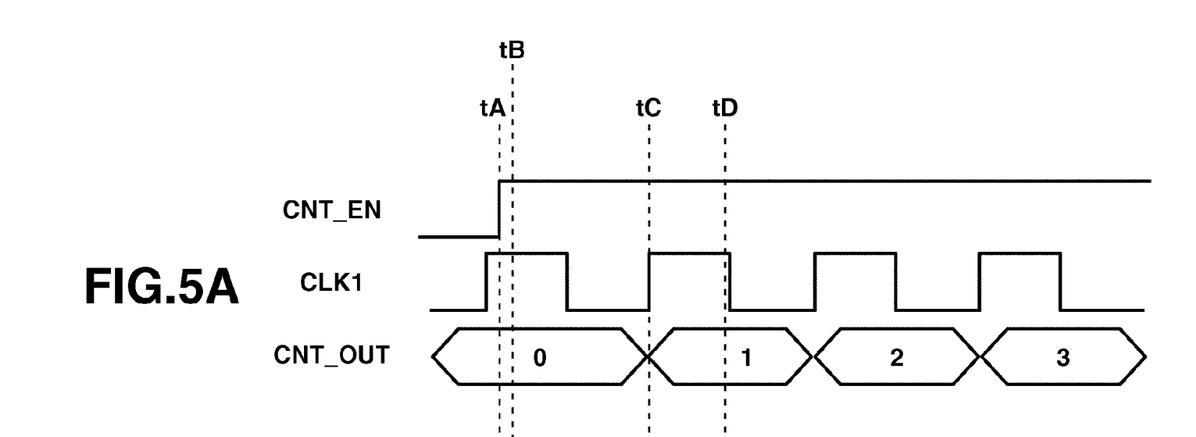
FIGS. 5A and 5B illustrate an example of a possible operation in a case where the count signal generation unit according to the first exemplary embodiment is not used.
Figure 5B:
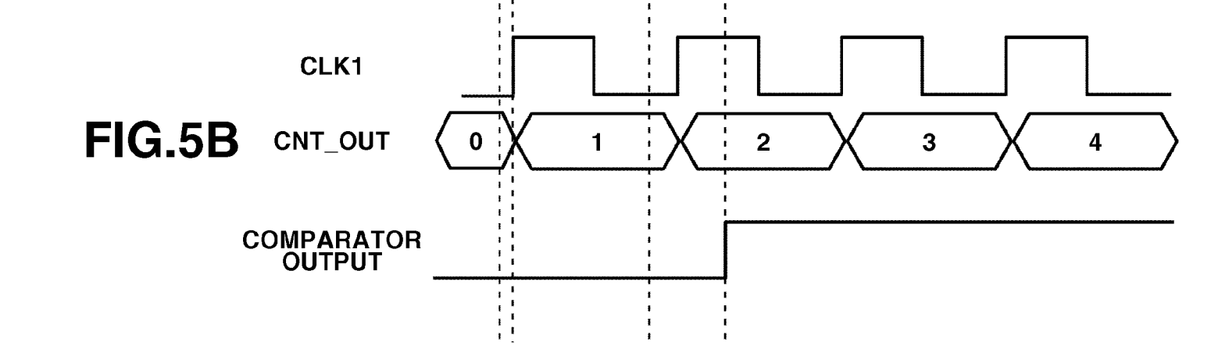

If it is provided that the output of the comparator 3 for causing the count signal CNT_OUT to be stored in the storage unit 4 varies at time tD, different values are written in the storage unit 4 in a case of FIG. 5A and a case of FIG. 5B even in a case where time periods between the time tA and the time tD are the same in both cases. In other words, the digital signals obtained therefrom become different values despite that the analog signals to be subjected to the A/D conversion are the same. In the photoelectric conversion device controlled row by row as illustrated in FIG. 1, even when uniform light is irradiated to the rows, the analog signals are converted into digital signals having different values per each row. Therefore, a resulting image includes a horizontal stripe. When compared with a randomly occurring noise, a noise appearing in the form of a line is visible with ease, resulting in showing a remarkable degradation of an image quality.

Figure 2:
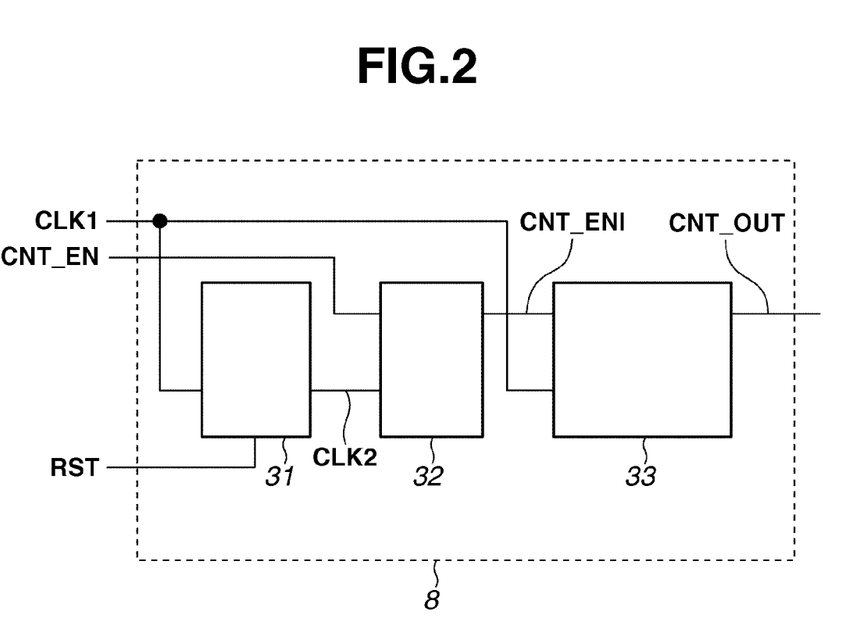
FIG. 2 illustrates an example of a configuration of a count signal generation unit according to the first exemplary embodiment.

Contrary to the above described configuration, in the present exemplary embodiment, since the counting operation of the counter circuit 33 is controlled by using the internal count start signal CNT_ENI obtained such that the second clock signal CLK2 generated based on the first clock signal CLK1 is brought into synchronization with the count start signal CNT_EN, shifting up to 4 cycles is allowed with respect to the first clock signal CLK1 in a case exemplified in FIG. 2. In other words, regardless of what timing the count start signal CNT_ENI rises during a period between the time t5 and the time t3, the internal count start signal CNT_ENI rises at the time t3. Therefore, the operation of the counter circuit 33 can be controlled with high accuracy.

Figure 6:
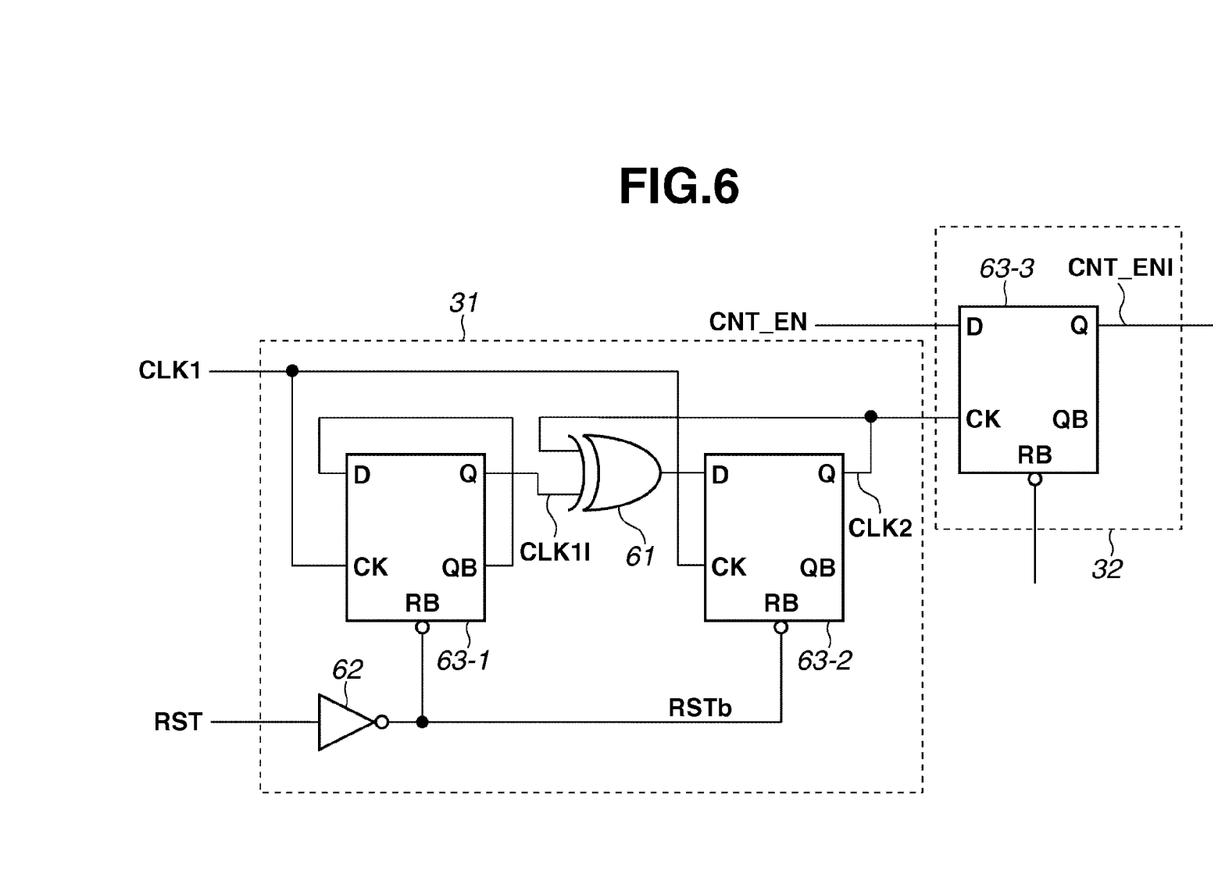
FIG. 6 illustrates an example of a configuration of each of the second clock signal generation unit and the clock synchronization unit according to the first exemplary embodiment.

FIG. 6 illustrates an example of a configuration of each of the second clock signal generation unit 31 and the clock synchronization unit 32. The second clock signal generation unit 31 operates as the second counter circuit. The second clock signal generation unit 31 is a synchronous counter circuit composed of two flip-flops 63-1 and 63-2 and an exclusive OR circuit (XOR circuit) 61. An inverter circuit 62 inverts the reset signal RST to input the inverted reset signal RST into the flip-flop 63 in the form of a signal RSTb. A Q-terminal of the flip-flop 63-1 is connected to one of input terminals of the XOR circuit 61. A QB-terminal for outputting an inversion signal output via the Q-terminal is connected to a D-terminal. A Q-terminal of a flip-flop 63-2 is connected to the other one of the input terminals of the XOR circuit 61 as well as connected to a CK-terminal of a flip-flop 63-3. An output terminal of the XOR circuit 61 is connected to a D-terminal of the flip-flop 63-2. The configuration enables generation of the second clock signal CLK2 which is brought into synchronization with the first clock signal CLK1 and of which frequency is divided into quarter of the first clock signal CLK1. The clock synchronization unit 32 can realize the above described operation by the single-stage flip-flop 63-3. When the flip-flop 63-3 receives the second clock signal CLK2 and the count start signal CNT_EN, the clock synchronization unit 32 outputs a count actuating signal CNT_ENI synchronized with the second clock signal CLK2. The reset signal RST may be applied to the flip-flop 63-3 of the clock synchronization unit 32 once at the time of startup of the photoelectric conversion device. Alternatively, the inverted reset signal RSTb to be input into the flip-flop 63 of the second clock signal generation unit 31 may be applied to the flip-flop 63-3 of the clock synchronization unit 32.

Figure 7:
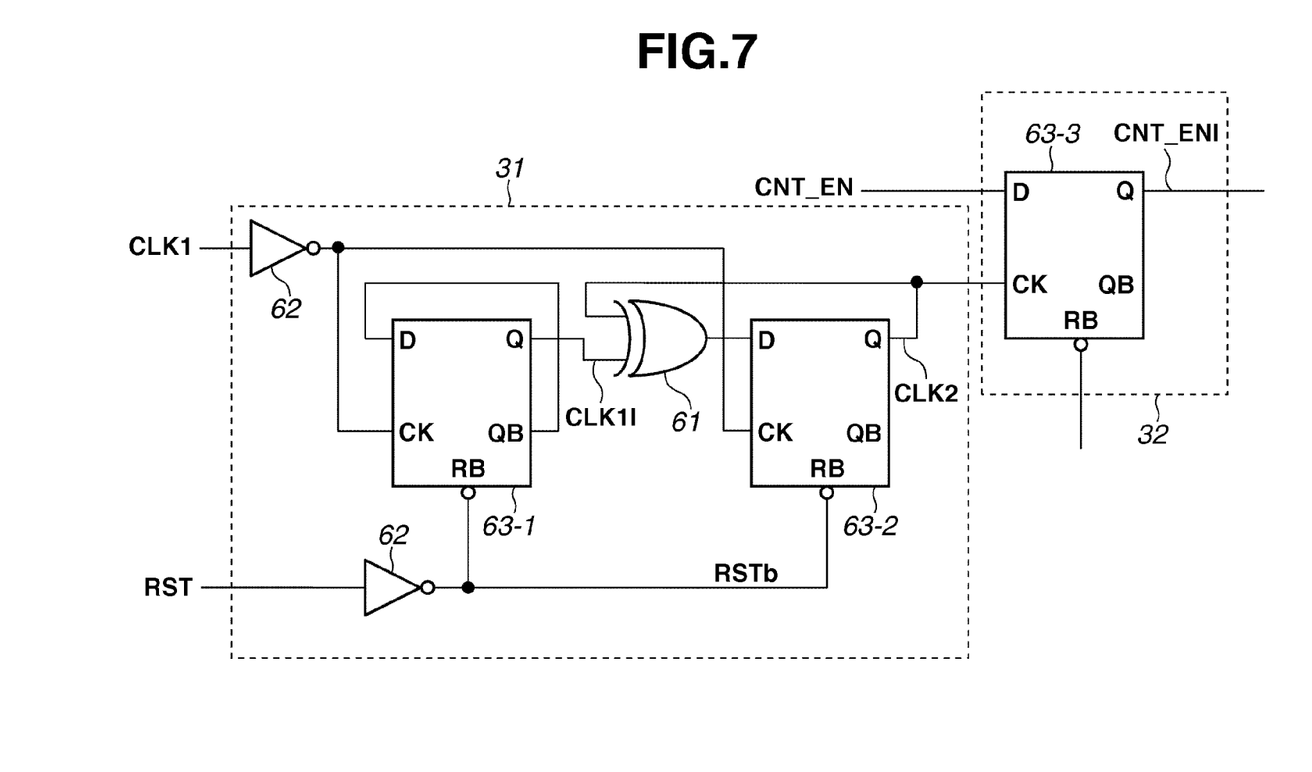
FIG. 7 illustrates another example of a configuration of each of the second clock signal generation unit and the clock synchronization unit according to the first exemplary embodiment.

The second clock signal generation unit 31 and the clock synchronization unit 32 may be configured in a manner as illustrated in FIG. 7 in addition to the example illustrated in FIG. 6. In the configuration of FIG. 7, each of the flip-flop 63-1 and the flip-flop 63-2 receives the first clock signal CLK1 via an inverter 62'. In this case, in the timing diagram of FIG. 4, the clock signal CLKIN and the second clock signal CLK2, of which frequencies are divided in synchronization with the fall of the first clock signal CLK1, rise.

Figure 8:
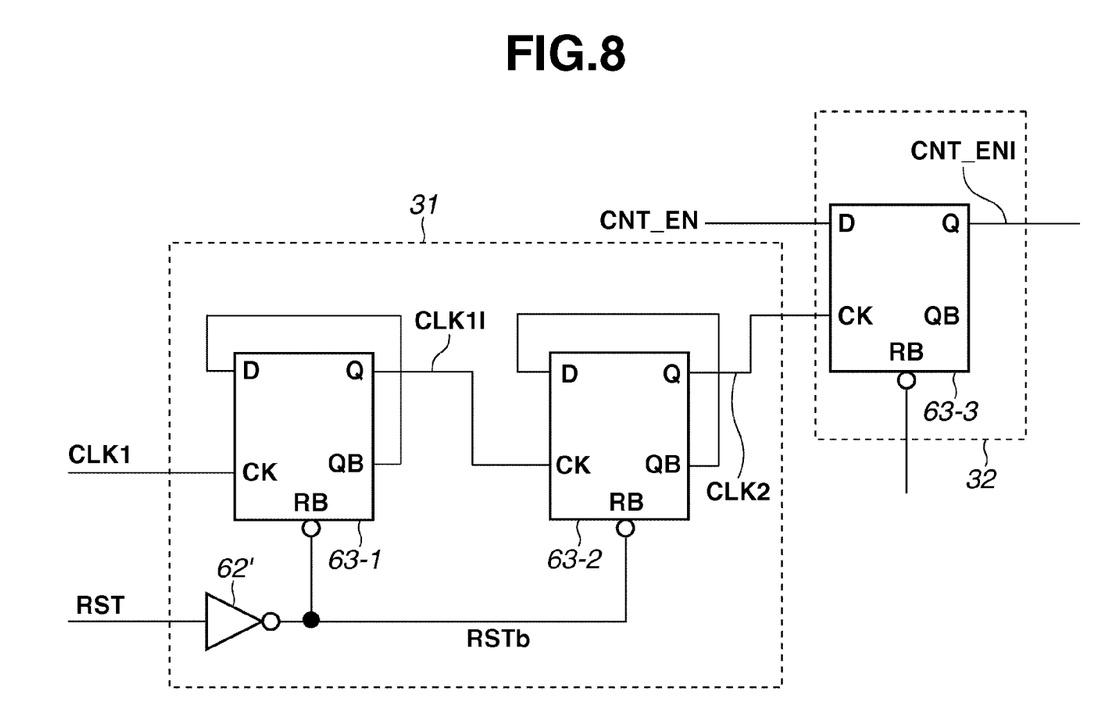
FIG. 8 illustrates yet another example of a configuration of each of the second clock signal generation unit and the clock synchronization unit according to the first exemplary embodiment.

FIG. 6 illustrates a case where the second clock signal generation unit 31 is configured by using a synchronous counter circuit. However, the second clock signal generation unit 31 may also be configured by using asynchronous counter circuit as illustrated in FIG. 8. The configuration of FIG. 8 differs from the configuration of FIG. 6 in that the output of the Q-terminal of the flip-flop 63-1 is connected to a CK-input terminal of the flip-flop 63-2 and in that the output of the QB-terminal as an inverted output of the flip-flop 63-2 is connected to a D-input terminal of the flip-flop 63-2. More specifically, both flip-flops 63-1 and 63-2 operate in synchronization with the first clock signal CLK1 in the exemplary configuration of FIG. 6, whereas only the flip-flop 63-1 operates in synchronization with the first clock signal CLK1 in the exemplary configuration of FIG. 8.

In the above description, a configuration of a frequency divider in which a frequency of the first clock signal CLK1 is divided into quarter to generate the second clock signal CLK2 is exemplified. The frequency of the first clock signal CLK1 may be divided into (1/N)-fold, provided that N is a natural number.

As described above, in the present exemplary embodiment, the counting operation of the counter circuit 33 is controlled by the internal count start signal CNT_ENI obtained such that the second clock signal CLK2 generated based on the first clock signal CLK1 is brought into synchronization with the count start signal CNT_EN. The configuration enables decrease of the shifting of the count start time of the counter circuit 33. As a result, the operation of the counter circuit 33 can be controlled with high accuracy. In the photoelectric conversion device, a stripe-shaped noise possibly generated on an image to be obtained can be decreased.

Figure 9:
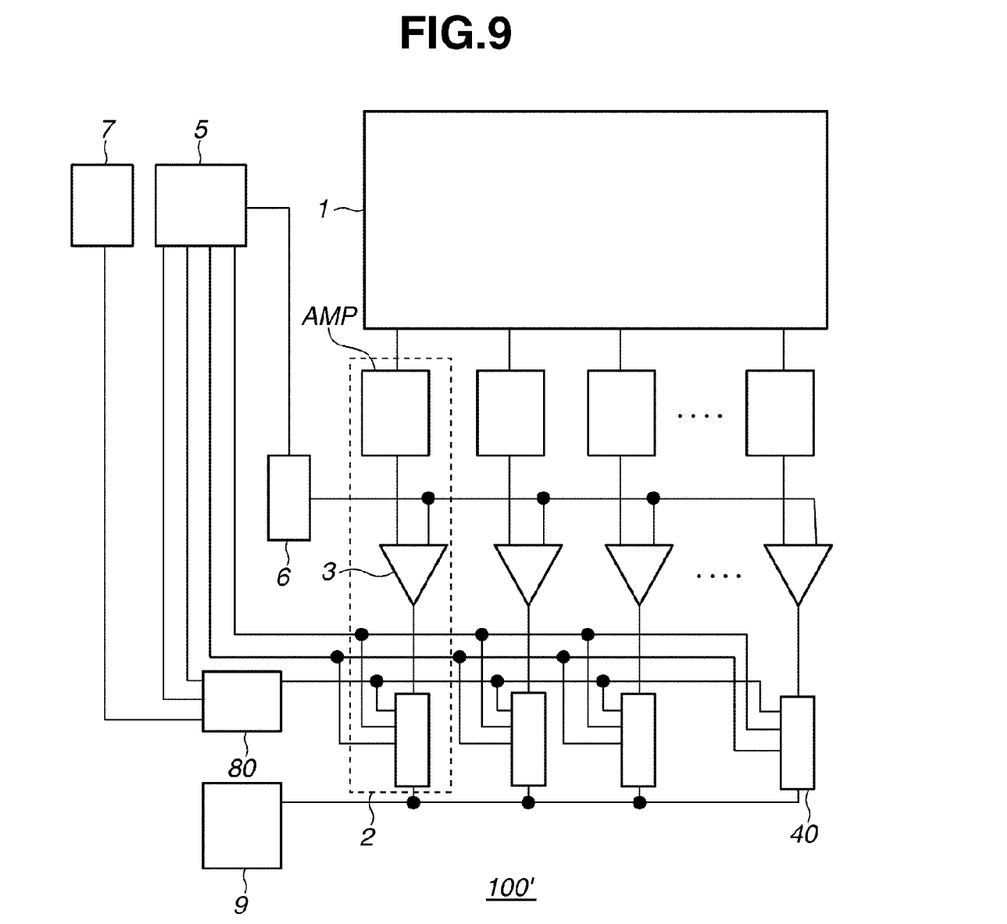
FIG. 9 illustrates an example of a configuration of a photoelectric conversion device according to a second exemplary embodiment.

A second exemplary embodiment of the present invention is described below. FIG. 9 illustrates an example of a configuration of a photoelectric conversion device according to the present exemplary embodiment. Components similar to those of the photoelectric conversion device according to the first exemplary embodiment are provided with the similar reference numbers and descriptions thereof are omitted here.

A photoelectric conversion device 100' differs from the photoelectric conversion device 100 in that the photoelectric conversion device 100' includes storage units 40 instead of the storage units 4 and includes a clock signal supply unit 80 instead of the count signal generation unit 8.

Each storage unit 40 includes an up-down counter and receives a count clock signal CNT_CLK from the clock signal supply unit 80 and an up-down selection signal UD_SEL and a counter reset signal CNT_RST from a timing signal generation unit 5. Further, the storage unit 40 receives the output of the comparator 3. The up-down selection signal UD_SEL is a signal for making a selection, when the up-down counter counts the count clock signal, as to whether a count-up for increasing a count value is to be performed or whether a count-down for decreasing the count value is to be performed. The signals are shared by a plurality of storage unit 40.

The clock signal supply unit 80 receives the first clock signal CLK1 from the first clock signal generation unit 7 and the count start signal CNT_EN and the reset signal RST from the timing signal generation unit 5.

The present exemplary embodiment differs from the first exemplary embodiment in that the counter circuit 33 included in the count signal generation unit 8 is shared by the storage units 4 of the plurality of columns in the first exemplary embodiment, whereas a counter circuit is provided to each column of the pixel array 1 in the present exemplary embodiment.

An operation of the photoelectric conversion device 100' according to the present exemplary embodiment is described below with reference to FIG. 10. As similar to a case of the first exemplary embodiment, operations performed in the N signal A/D conversion period and the S signal A/D conversion period are illustrated. The count clock signal CNT_CLK performs a counting operation during a period in which the count start signal CNT_EN is at level H.

Figure 10:
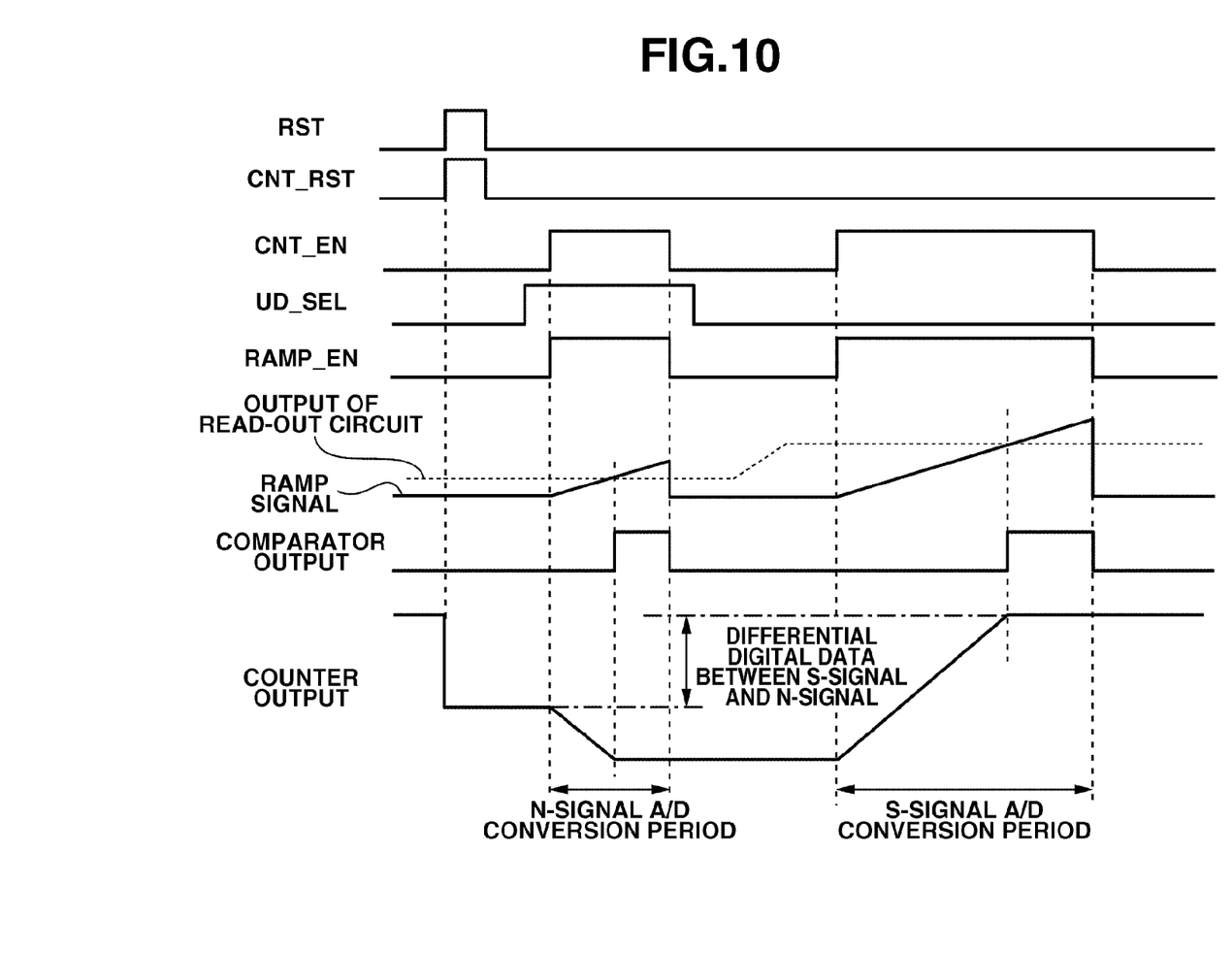
FIG. 10 illustrates an example of an operation of the photoelectric conversion device according to the second exemplary embodiment.

In the operation illustrated in FIG. 10, the up-down counter performs the count-down when the up-down selection signal UD_SEL reaches level H during the N signal A/D conversion period, whereas, the up-down counter performs the count-down when the up-down selection signal UD_SEL reaches level L in the S signal A/D conversion period. The up-down counter stops its counting operation in response to the shifting of the output of the comparator 3 from level L to level H in each A/D conversion period. Since the up-down counter is not reset during a period between the N signal A/D conversion period and the S signal A/D conversion period, the up-down counter of each column stores digital data corresponding to a difference between the S signal and the N signal after the end of the S signal A/D conversion period. The configuration enables obtainment of the difference between the S signal and the N signal even without providing the first storage unit 4n and the second storage unit 4s to each column of the pixel array 1.

Figure 11:
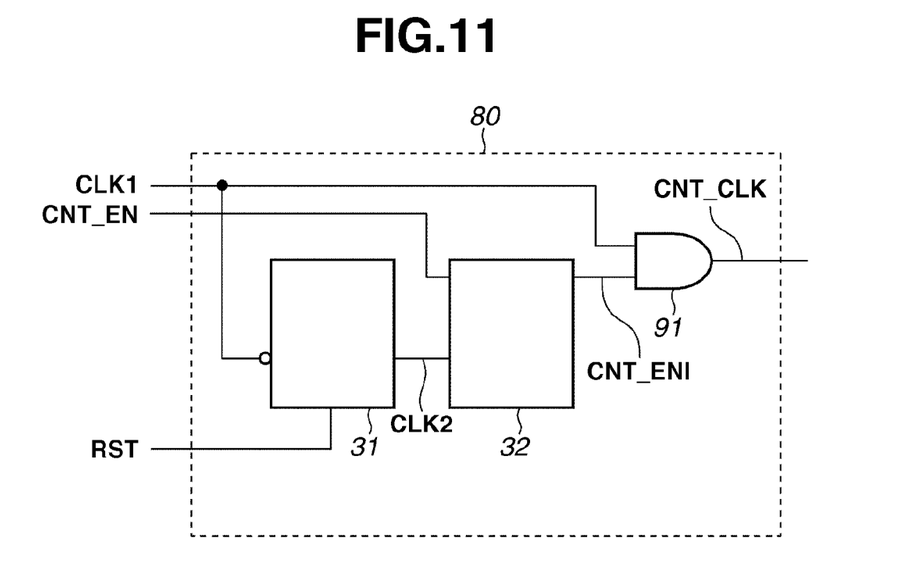
FIG. 11 illustrates an example of a configuration of a count signal generation unit according to the second exemplary embodiment.

FIG. 11 illustrates an example of a configuration of a clock signal supply unit 80. The clock signal supply unit 80 includes a second clock signal generation unit 31, a clock synchronization unit 32, and an AND circuit 91. The clock signal supply unit 80 differs from the count signal supply unit 8 of FIG. 3 in that the AND circuit 91 is provided instead of the counter circuit 33. Also, in the configuration, as similar to the case of the counter signal supply unit 8, the second clock signal generation unit 31 generates an internal count start signal CNT_ENI such that the second clock signal CLK2 generated based on the first clock signal CLK1 is brought into synchronization with the count start signal CNT_EN. An AND operation between the first clock signal CLK1 and the internal count signal CNT_ENI is supplied to the plurality of storage units 40 as the count clock signal CNT_CLK.

Figure 12:
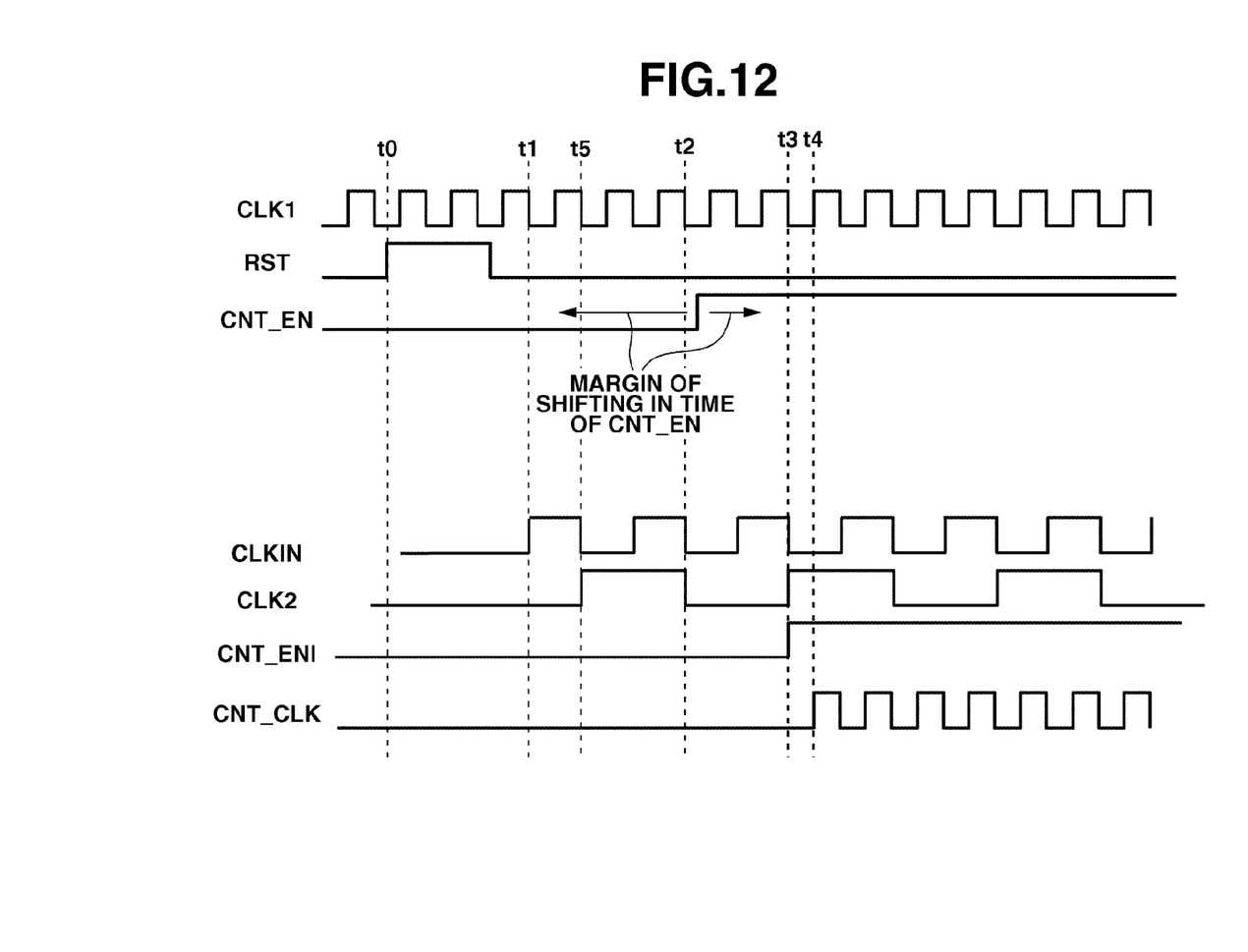
FIG. 12 illustrates an example of an operation of the count signal generation unit according to the second exemplary embodiment.

An operation of the clock signal supply unit 80 is described below with reference to FIG. 12. In FIG. 12, the input terminal to which the first clock signal CLK1 is applied among the input terminals of the second clock signal generation unit 31 is provided with an inverter.

FIG. 12 illustrates, in addition to the first clock signal CLK1, the reset signal RST, and the count start signal CNT_EN all to be supplied to the clock signal supply unit 80, an internal count signal CLKIN and a second clock signal CLK2 both generated in the second clock signal generation unit 31, an internal count actuating signal CNT_ENI generated in the clock synchronization unit 32, and a count clock signal CNT_CLK output from the clock signal supply unit 80. In the present exemplary embodiment, the second clock signal generation unit 31 generates the internal count signal CLKIN obtained by dividing the frequency of the first clock signal CLK1 into halves, and further generates the second clock signal obtained by dividing the frequency of the internal count signal CLKIN into halves.

When the second clock signal generation unit 31 receives the reset signal RST at level H at time t0, the second clock signal generation unit 31 stops the generation of the second clock signal CLK2.

After the reset signal RST is shifted to level L, the second clock signal generation unit 31 starts the counting operation from time t1 at which the first clock signal CLK1 is shifted to level L. On and after the time t1, the internal clock signal CLKIN rises in synchronization with the fall of the first clock signal CLK1, and the second clock signal CLK2 rises in synchronization with the fall of the internal clock signal CLKIN.

At the time t2, the count start signal CNT_EN reaches level H. The clock synchronization unit 32 outputs the internal count start signal CNT_ENI obtained such that the count start signal CNT_EN is brought into synchronization with the second clock signal CLK2. Therefore, the internal count start signal CNT_ENI is shifted to level H in synchronization with the rise of the second clock signal CLK2 at the time t3.

The AND circuit 91 brings the internal count start signal CNT_ENI into synchronization with the first clock signal CLK1. Therefore, during the period in which the internal count start signal CNT_ENI is at level H, the AND circuit 91 outputs the count clock signal CNT_CLK in synchronization with the rise of the first clock signal CLK1. In response to thus generated count clock signal CNT_CLK and the first clock signal CLK1, the counter circuit of each column performs the counting operation.

The second clock signal generation unit 31 and the clock synchronization unit 32 in the clock signal supply unit 80 can be realized with the configuration of FIG. 7.

As described above, in the present exemplary embodiment, the counter circuit is operated by using the internal count start signal CNT_ENI obtained such that the count start signal CNT_EN is brought into synchronization with the second clock signal CLK2 generated based on the first clock signal CLK1. The configuration enables decrease of the shifting of the time for starting the counting operation performed by the counter circuit. As a result, the operation of the counter circuit can be controlled with high accuracy. Specifically, in the photoelectric conversion device, generation of the stripe-shaped noise can be decreased.

Figure 13:
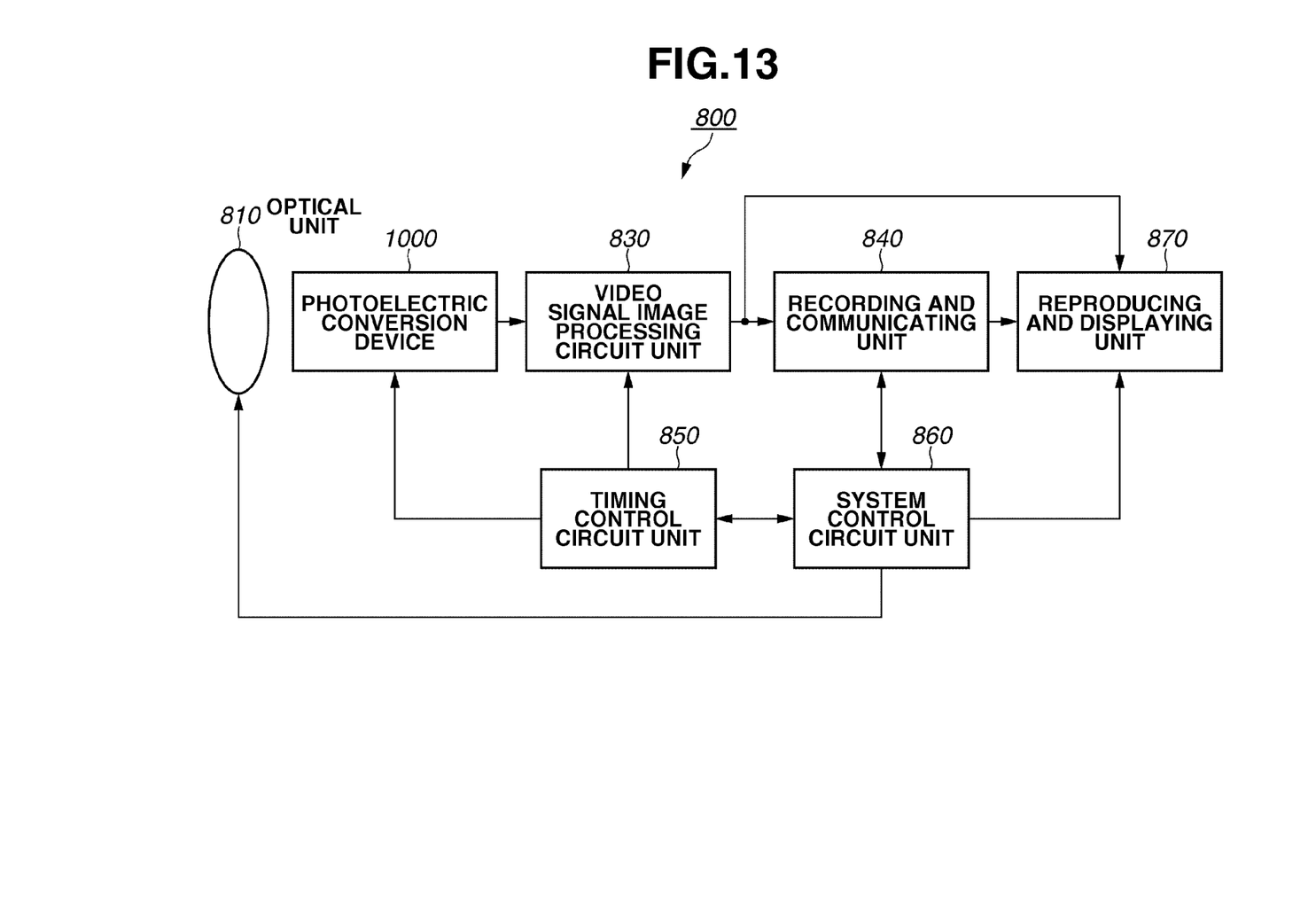
FIG. 13 is a block diagram illustrating an example of a configuration of an imaging system according to a third exemplary embodiment.

An imaging system according to a third exemplary embodiment is summarized below with reference to FIG. 13.

An imaging system 800 includes, for example, an optical unit 810, a photoelectric conversion device 1000, a video signal image processing circuit unit 830, a recording and communicating unit 840, a timing control circuit unit 850, a system control circuit unit 860, and a reproducing and displaying unit 870. The photoelectric conversion device described in each of the above exemplary embodiments is used as the photoelectric conversion device 1000. A case where the timing signal generation unit 5 illustrated in FIGS. 1 and 9 is included not in the photoelectric conversion device but in the timing control circuit unit 850 is illustrated.

The optical unit 810 as an optical system, e.g., lens, causes light from an object to be formed into an image on the pixel array composed of a plurality of two-dimensionally arranged pixels of a photoelectric conversion device 1000, thereby forming the image of the object. The photoelectric conversion device 1000 outputs a signal according to the light formed into the image on the pixel array at timing of receiving a signal from the timing control circuit unit 850.

A video signal image processing circuit unit 830 as a video signal processing unit receives the signal output from the photoelectric conversion device 1000. Then, the video signal image processing circuit unit 830 performs processing such as a noise reduction and a gain adjustment to the signal according to a method defined by a program. The recording and communicating unit 840 receives the signal obtained by the processing of the video signal image processing circuit unit 830 in the form of image data. The recording and communicating unit 840 transmits a signal for forming an image to the reproducing and displaying unit 870 to cause the reproducing and displaying unit 870 to reproduce and display a moving image or a still image. The recording and communicating unit 840 communicates with a system control circuit unit 860 in response to a signal from the video signal image processing circuit unit 830. The recording and communicating unit 840 also records a signal for forming an image on a recording medium (not illustrated).

The system control circuit unit 860 generally controls an operation of the imaging system and controls driving of the optical unit 810, the timing control circuit unit 850, the recording and communicating unit 840, and the reproducing and displaying unit 870. The system control circuit unit 860 includes, for example, a storage device (not illustrated) as a recording medium and a program required for controlling the operation of the image system recorded therein. The system control circuit unit 860 supplies a signal for switching a driving mode according to, for example, an operation of the user within the imaging system. Specific examples thereof include a change of a row to be read out and a row to be reset, a change of an angle of view corresponding to an electrical zooming, and shifting of the angle of view corresponding to an electronic image stabilization.

The timing control circuit unit 850 controls driving timings of the photoelectric conversion device 1000 and the video signal image processing circuit unit 830 based on a control by the system control circuit unit 860 as a control unit.

The video signal image processing circuit unit 830 holds the correction coefficient described in each of the above described exemplary embodiments and performs correction processing to the signal output from the photoelectric conversion device 1000.

While the present disclosure has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims priority from Japanese Patent Application No. 2011-223296 filed Oct. 7, 2011, which is hereby incorporated by reference herein in its entirety.

What is claimed is:

1. A photoelectric conversion device comprising a pixel array including a plurality of columns of pixels, a signal processing unit, and a plurality of analog-to-digital converters, each including a comparator for comparing a reference signal with an analog signal and a storage unit, the photoelectric conversion device further comprising:
   a reference signal supply unit configured to supply the reference signal, which varies with time, to each comparator of the plurality of analog-to-digital converters;
   a second clock signal generation unit configured to generate a second clock signal based on a first clock signal, and to output the second clock signal;

a clock synchronization unit configured to output a count start signal in synchronization with the second clock signal output from the second clock signal generation unit; and a counter circuit configured to perform a counting operation of generating a count signal by counting the first clock signal in response to the count start signal output from the clock synchronization unit, and to output the count signal to each storage unit of the plurality of analog-to-digital converters, wherein each storage unit of the plurality of analog-to-digital converters is configured to store the count signal according to an output of the corresponding comparator, wherein each storage units of the plurality of analog-to-digital converters includes a first storage unit and a second storage unit, and wherein the signal processing unit performs a differential processing of the count signals output from the first storage unit and the second storage unit.

2. The photoelectric conversion device according to claim 1, wherein the photoelectric conversion device includes a plurality of counter circuits, and wherein the plurality of counter circuits is provided each corresponding to each comparator of the plurality of analog-to-digital converters and stops the counting operation in response to an output of the corresponding comparator.

3. The photoelectric conversion device according to claim 1, wherein the second clock signal generation unit includes a frequency divider for dividing a frequency of the first clock signal.

4. The photoelectric conversion device according to claim 1, wherein the second clock signal generation unit divides a frequency of the first clock signal into 1/N-fold of the frequency of the clock signal, where N is a natural number.

5. The photoelectric conversion device according to claim 1, further comprising an amplifier configured to amplify a signal output from a pixel included in the pixel array to supply an amplified signal to the corresponding comparator in the form of the analog signal.

6. The photoelectric conversion device according to claim 5, wherein the amplifier is an inverting amplifier.

7. The photoelectric conversion device according to claim 5, wherein the amplifier is a variable gain amplifier.

8. The photoelectric conversion device according to claim 1, wherein the second clock signal generation unit includes a second counter circuit.

9. The photoelectric conversion device according to claim 8, wherein the second counter circuit includes a synchronous counter circuit.

10. The photoelectric conversion device according to claim 8, wherein the second counter circuit includes an asynchronous counter circuit.

11. The photoelectric conversion device according to claim 8, wherein the pixel array includes a plurality of rows of pixels, and wherein the second counter circuit is reset in a vertical synchronization period for selecting the plurality of rows of pixels.

12. The photoelectric conversion device according to claim 11, wherein the second counter circuit is reset in a horizontal synchronization period for selecting one of the rows.

13. An imaging system comprising:
the photoelectric conversion device according to claim 1;
an optical system configured to form an image on the pixel array; and
a video signal processing unit electrically connected to the photoelectric conversion device, and configured to generate image data by processing a signal output from the photoelectric conversion device.

14. A photoelectric conversion device comprising a pixel array including a plurality of columns of pixels, a signal processing unit, and a plurality of analog-to-digital converters, each including a comparator and a storage unit, the photoelectric conversion device further comprising:

a reference signal supply unit electrically connected to each comparator of the plurality of analog-to-digital converters, and configured to supply the reference signal, which varies with time;

a second clock signal generation unit configured to generate a second clock signal based on a first clock signal;

a clock synchronization unit electrically connected to the second clock signal generation unit, and configured to output a count start signal in synchronization with the second clock signal output from the second clock signal generation unit; and a counter circuit electrically connected to each storage unit of the plurality of analog-to-digital converters and the clock synchronization unit, the counter circuit being configured to perform a counting operation of generating a count signal by counting the first clock signal in response to the count start signal output from the clock synchronization unit, and to output the count signal to each storage unit of the plurality of analog-to-digital converters, wherein each storage unit of the plurality of analog-to-digital converters is configured to store the count signal according to an output of the corresponding comparator, wherein each storage unit of the plurality of analog-to-digital converters includes a first storage unit and a second storage unit, and wherein the signal processing unit is electrically connected to each storage unit of the plurality of analog-to-digital converters, and performs a differential processing of the count signals stored in the first storage unit and the second storage unit.

* * * * *